Patented Dec. 2, 1941

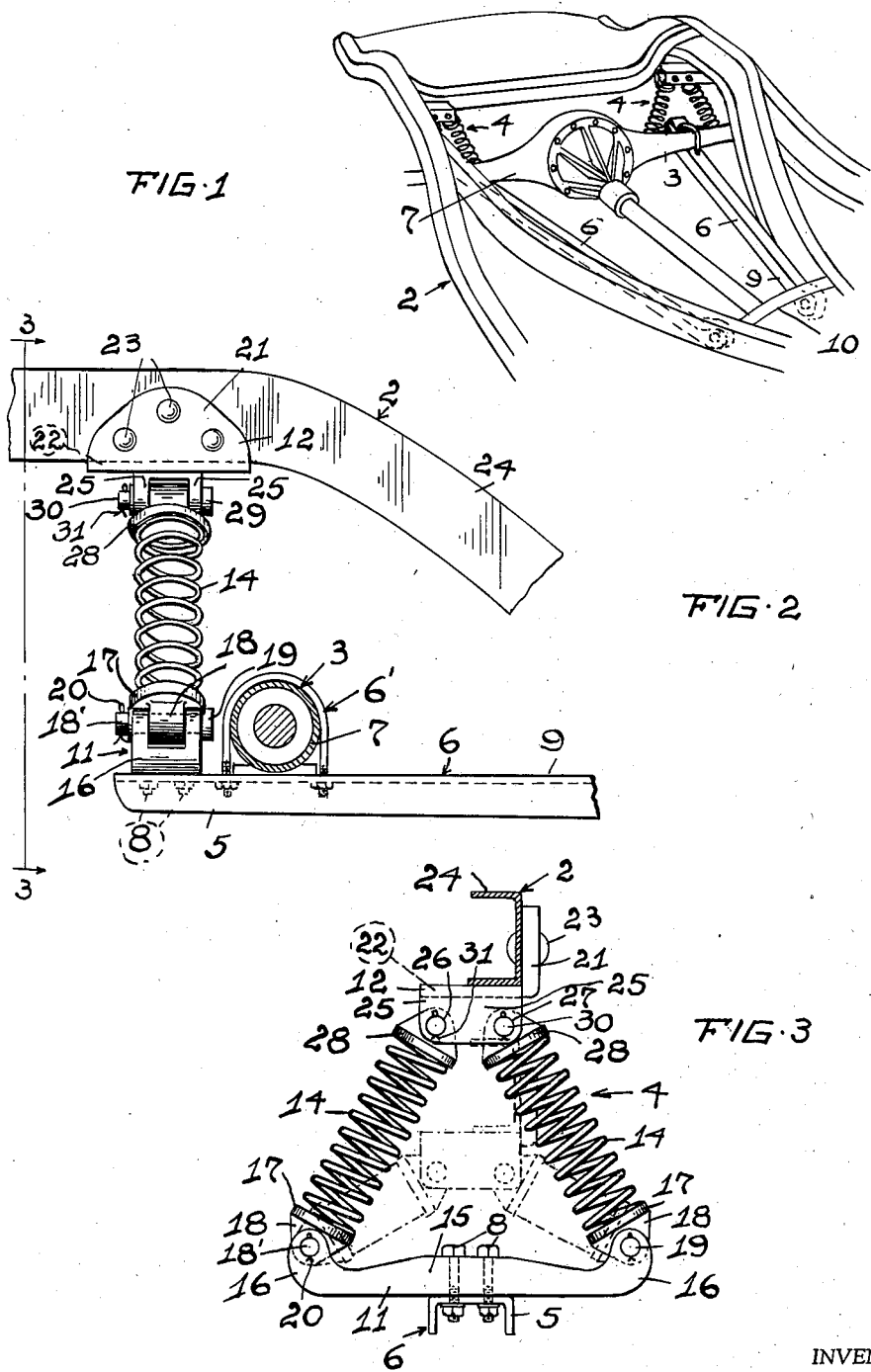

2,264,298

UNITED STATES PATENT OFFICE 2,264,298

COIL SPRING SUSPENSION FOR AUTOMOBILES

George W. Crabtree, Cleveland Heights, Ohio

Application September 25, 1939, Serial No. 296,388

6 Claims. (Cl. 267—60)

This invention relates in general to automobiles and more particularly to coil spring suspensions for automobiles in which a frame structure and axles are supporting each other by means of coil spring suspensions coupling front and rear axles of the automobile with its frame structure. Such coil spring suspensions are extremely lively and necessitate sensitive shock absorbers to overcome excessive rebound action.

It is the primary object of this invention to provide an improved coil spring suspension for automobiles which embodies variable rate coil spring structures, so as to counteract under load compression and rebound at variable rates. Such primary object according to the invention is effected by spring structures in which the springs of spring couples are angularly related with respect to each other and, in addition, mounted at their opposite ends so as to permit of changes in the angular relationship of the springs of the spring couple under different loads on the spring structures.

Another object of the invention is to provide an improved coil spring suspension for automobiles embodying variable rate coil spring structures, each of which includes a plurality of inclined symmetrically arranged, at their opposite ends pivotally supported springs to permit of differential tilting of these springs toward each other at a rate proportionate to the rate of compression of the spring structure.

With these and other objects in view, the invention consists in certain novel features of construction and combination of parts, the essential elements of which are set forth in the appended claims; and a preferred form of embodiment of the invention is hereinafter shown with reference to the drawing accompanying and forming part of this specification.

In the drawing:

Fig. 1 is a perspective fragmentary view of an automobile chassis embodying a coil spring suspension according to the invention arranged between the rear axle and the frame structure of an automobile.

Fig. 2 is a fragmentary sectional view through the rear axle of an automobile with a coil spring suspension arranged between the rear axle and the frame structure, the coil spring suspension being shown in elevation; and Fig. 3 is a sectional view on line 3—3 of Fig. 2 showing the coil spring structure in elevation.

In the exemplified form shown in the drawing, the automobile frame member 2 is yieldingly coupled with its rear axle 3 by means of a spring suspension embodying two symmetrically arranged spring structures 4. These structures are secured to the end portions 5 of stabilizers 6 which are arranged back of axle housing 7, bolts 8 being used for such purpose. Stabilizers 6 which are rigidly secured to the rear axle 3 as at 6' have their arms 9 forwardly extended for pivotal connection with frame member 2 near its reenforcing cross member 10 and this pivotal connection preferably includes as customary, rubber insulation at the pivotal anchorages to permit of slight yield of these anchorages so as to permit of tilting of axes 3 with respect to frame 2.

The two spring structures, one for each suspension of a wheel, consist of an elongated base member 11, a top member 12, and two compression springs 14, arranged in inclined position between members 11 and 12 so as to yieldingly space said members. Base member 11 embodies a heavily constructed central portion 15 which rests upon end portion 5 of stabilizer 6 and is secured thereto by the bolts 8. The opposite ends of base member 11 are formed with upwardly extended perforated bearing portions 16, each of which mounts pivotally connected therewith recessed spring seat brackets 17, provided with downwardly extended, substantially triangular shaped flanges 18, which flanges contact the inner sides of perforated bearing portions 16 and are pivotally connected therewith by headed pins 19. Preferably, pins 19 have their ends 18' extended outwardly and carry cotter pins 20 at these ends to prevent axial shifting of the pins in bearing portions 16. The top member 12 consists of a substantially U-shaped bracket, the flange 21 of which is riveted at 23 to the U-shaped channel member 24 of frame member 2. Top member 12 furthermore is provided with downwardly extended flanges 25 which extend from opposite sides of lower flange 22 and are perforated at 26 and 27 to permit of pivotal mounting of recessed spring seat brackets 28 on said top member. Headed pins 29 serve this purpose and these pins have the ends 30 outwardly extended and carry cotter pins 31 to prevent axial shifting of pins 29 in the perforations 26 and 27 of the bracket. The pivotally mounted spring seat brackets 17 and 28 support the opposite ends of springs 14 and permit of yielding compression of these springs when base and top members 11 and 12 are forced toward each other and springs 14 continuously change their inclination with respect to each other, whereas the pivot points of spring seat brackets 17 and 28 travel on substantially vertical lines. The change in the inclination of springs 14 is readily possible due to the pivotal support of spring seat brackets 17 and 28 and such change effects a variable compression and rebound rate in the spring seat structure, springs 14 differentially counteracting differential increases or decreases in the compression force of the spring structure. Such compression force is not proportionate to the compression of each spring, but largely depends upon the angular relationship of the springs with respect to the vertical axis of the spring structure.

Excessive experiments have shown that excellent results may be obtained with spring structures in which the springs are inclined approximately 60° with respect to each other when the spring structures are compressed by a normal load, however, any other angles of inclination may be chosen with similar results provided that in such case wire gage of the coil springs and length of these springs are changed to fit the angle of inclination of the springs.

The described spring structure which, as delineated above, provides a variable rate of compression and rebound action is smooth in action and reaction and, when compared with a single coil spring, permits of great compression of the structure with small compression of its coil springs; the compression of the coil springs of the structure being substantially less than the compression of a single coil spring when both, spring structure and individual coil spring, are equally compressed. This described action of the structure materially softens same as counteraction during compression is built up at a low rate and furthermore decreases the rate of reaction of the structure, so that spring structures according to the invention provide a dampening effect somewhat similar to that of shock absorbers and thus results in proper control of compression and rebound of a chassis equipped with coil spring suspension according to the invention, even with shock absorbers of low efficiency.

In addition, coil spring suspensions embodying the improved spring structure tend to cushion side to side movements of a frame structure with respect to its axles and thus help to effect proper alignment of the frame and the axles of an automobile. Such aligning action of the spring structure is due to the opposing forces of its two springs, which forces are proportionate to the inclination of the springs and increase with increasing compression of the spring structure.

It is obvious that the specifically described and shown structure is merely intended to be an exemplified form of the invention and that I do not wish to limit my invention to this particular construction.

Having thus described the invention, what I claim is:

1. A coil spring suspension for a vehicle embodying supporting means pivotally connected to the frame of the vehicle and rigidly secured to its axle, and a variable rate coil spring structure yieldingly coupling said frame and supporting means, said coil spring structure including spaced top and bottom members, and two symmetrically mounted inclined coil springs having their opposite ends pivotally coupled with said top and bottom members.

2. A coil spring suspension for a vehicle embodying supporting means pivotally connected to the frame of the vehicle and rigidly secured to its axle, and a variable rate coil spring structure yieldingly supporting said frame on said supporting means and axle, said coil spring structure including spaced top and bottom members, and two symmetrically mounted inclined coil springs, the upper ends of which converge closely toward each other, said coil springs have their opposite ends pivotally coupled with said top and bottom members.

3. In a vehicle a main frame, wheels for said frame, means hingedly connecting said wheels with said frame, and independent units of co-operating convergingly arranged springs yieldingly coupling each of said means with said frame, said units effecting a yielding support of said frame near said wheels, and permitting springing of said wheel without lateral vibrations of said frame when the vehicle is in motion.

4. A vehicle as described in claim 6, wherein said independent unit of co-operating, convergingly arranged coil springs each embody a bottom member, a top member arranged above said bottom member in symmetrical relation with respect thereto, spring supporting means pivotally mounted at the ends of said top and bottom members, and a plurality of coil springs seated with their opposite ends in said supporting means in inclined position with respect to each other.

5. A vehicle as described in claim 6, wherein said independent units of co-operating, convergingly arranged coil springs each embody an elongated bottom member, a shorter top member arranged above said bottom member in symmetrical relation with respect thereto, spring seating brackets pivotally mounted at the ends of said top and bottom members, and a plurality of coil springs seated with their opposite ends in said seating brackets in inclined position with respect to each other.

6. In a vehicle a main frame, wheels for said frame, means hingedly connecting said wheels with said frame, and independent units of co-operating, convergingly arranged coil springs yieldingly coupling said means with said frame, said units being arranged to effect yielding support of said frame in areas adjacent to said wheels and permitting springing of said wheels without lateral vibrations of said frame when the vehicle is in motion.

GEORGE W. CRABTREE.